United States Patent [19]

Bohlin

[11] 4,231,607
[45] Nov. 4, 1980

[54] SIDE COLLISION PROTECTION SYSTEM FOR MOTOR VEHICLES

[75] Inventor: Nils I. Bohlin, Kungsbacka, Sweden

[73] Assignee: AB Volvo, Göteborg, Sweden

[21] Appl. No.: 893,053

[22] Filed: Apr. 3, 1978

[30] Foreign Application Priority Data

Apr. 14, 1977 [SE] Sweden .............................. 7704289

[51] Int. Cl.² .............................................. B60N 1/00
[52] U.S. Cl. ...................................... 296/63; 293/128
[58] Field of Search ..................... 296/28 R, 28 H, 30, 296/63, 146, 152, 65 A, 66, 67; 293/109, 128

[56] References Cited

U.S. PATENT DOCUMENTS

| | | | |
|---|---|---|---|
| 2,903,042 | 9/1959 | Thornburg | 296/63 |
| 3,279,816 | 10/1966 | Issigonis | 296/28 R X |
| 3,791,693 | 2/1974 | Hellriegel et al. | 296/146 |
| 4,017,117 | 4/1977 | Eggert, Jr. | 296/28 R X |

FOREIGN PATENT DOCUMENTS

| | | |
|---|---|---|
| 2551892 | 5/1976 | Fed. Rep. of Germany . |
| 2207039 | 6/1974 | France . |
| 2258280 | 8/1975 | France . |

*Primary Examiner*—Joseph F. Peters, Jr.
*Assistant Examiner*—Michael Mar
*Attorney, Agent, or Firm*—Brumbaugh, Graves, Donohue & Raymond

[57] ABSTRACT

A system for protecting motor vehicle occupants against injury in side collisions comprises first reinforcing members arranged between the exterior and interior panels of the vehicle body sides and/or doors and second reinforcing members incorporated in the vehicle seats, the members extending transversely to the vehicle and disposed to transmit, after a certain deformation of a press-loaded body side or door, the load to the floor of the vehicle and to the opposite body side or door. The first reinforcing members are made as essentially plastically deformable, energy absorbing members extending transversely over at least the greater part of the space between the exterior and interior panels of the body sides and/or doors and which vertically cover an area level with the bumpers of the vehicle. The second reinforcing members comprise members which take up pressing loads, are incorporated in the seat cushion support level with the first reinforcing members and have outer end surfaces located adjacent to or at an insignificant distance from the interior panels of the body sides and/or doors.

13 Claims, 7 Drawing Figures

SIDE COLLISION PROTECTION SYSTEM FOR MOTOR VEHICLES

The present invention relates to a system for protecting motor vehicle occupants for injuries in side collisions. This system comprises first reinforcement members disposed between the exterior and interior panels of the vehicle body and/or doors, and second reinforcement members incorporated in the vehicle seats, which members extend transversely to the vehicle and are disposed, after a certain deformation of a body side or door subjected to compression, to transmit the load to the floor of the vehicle and to the opposite side of the body or door.

One of the major problems in achieving greater collision safety in motor vehicles, and especially passenger cars, is improving the vehicle as regards side collision protection. The basic problem is, in contrast to frontal collisions, that there is a comparatively small amount of material between the impact object and the driver or passenger and that the available deformation path is short. There is a great imbalance between the tendency for deformation in the front and the side of the vehicle. This results in the passenger compartment being subjected to heavy deformation in side collisions. Statistics from traffic accidents show that personal injuries in side collisions increase with the deformation of the vehicle, both as regards frequency and seriousness. The result is serious personal injuries even at relatively slow speeds.

Different solutions have been presented for improving protection in side collisions. Most of them have concentrated on reinforcing the doors by mounting reinforcement members between the external and the internal panels of the door in the form of tubular structures, corrugated plates and the like. The purpose has been to achieve a rigid structure which under a certain load, determined by the safety regulations for example, would be subjected to a certain maximum deformation. In certain cases the doors have been provided with reinforcements in the lowermost portion in order to use the bottom rail on the vehicle body as a supporting member. Door reinforcements have also been arranged to form abutments against the seat frame. This construction is based on the idea that the door, after a certain deformation, will strike the frame of the seat and accelerate the seat with the passenger held in a safety harness which is especially designed to hold the passenger in place in the seat during lateral acceleration. This side collision protection is based to a certain extent on the same principles as head-on collision protection.

Common to the door-reinforced constructions is that a very small mass in the car which has been struck by another car is engaged in taking up energy in the initial stage of the collision. In principle, it is only the resistance to deformation of the door and the inertia of the seat and of the driver or passenger which during deformation of the door in contact with the interior side of the door resists additional deformation. The low resistance to deformation of the door/side of the vehicle which has been hit produces a minimal change in velocity in the impact structure of the vehicle which has been hit. The driver/passenger or the seat is struck by a door panel which has a high velocity and is subjected to a powerful acceleration relative to his/its own car during the continued deformation before the striking and the struck car have reached a common final velocity.

To increase the strength of the passenger compartment, it is known to arrange, in combination with reinforcing arches around the seat-backs, transverse reinforcing pipes which end near the insides of the doors. These pipes are arranged slightly above waist height, level with the side-wall reinforcements in the doors. A pressing load in the area of the door reinforcement is transmitted, via the transverse reinforcements and the anchoring points of reinforcing arches in the floor and ceiling of the car, to the opposite door after a certain deformation. This increases the resistance to deformation of the door side in the reinforced area as compared with the constructions described previously. This construction, however, has many disadvantages which limit its effectiveness. In the first place, the door reinforcements and the transverse reinforcements or load-taking members are disposed above the most critical height, which is at bumper level. Accident statistics show that more than 50% of all side collisions involving passenger cars occur between two or more passenger cars. Most modern passenger cars have the bumpers placed at about the same height, namely level with or slightly below the passengers' or driver's hips. The known construction permits the bumper of the striking car to practically unimpeded penetrate far into the side of the car being hit. Said side is unreinforced at this level and the bumper can in principle penetrate all the way to the seat before the transverse elements become effective as impact absorbing members. Secondly, the placement of the transverse members requires the backrests to be at the same angle in order to transmit the pressing load from one side to the other. Even a small difference in the angle of the seat-backs results in a moment which significantly reduces the ability to transmit pressing forces from one seat via the other to the opposite side. This means that the construction is strongly dependent on a heavy reinforcing arch around the seat-backs on the one hand, and an effective anchoring of the same in the floor and ceiling of the car on the other hand, which means in turn that it cannot be used in cars with sun-roofs or convertible tops which prevent roof anchoring of the reinforcing arches. On the whole the known construction is such that it requires substantial modifications of existing vehicle constructions in order to be practicable.

The purpose of the present invention is to achieve a system for side collision protection of the type mentioned in the introduction, which is substantially more effective than previously known systems, which is simple in its construction, and which can be used in existing vehicle constructions without requiring extensive costly modifications of the same.

This is achieved according to the invention by first reinforcing members being made as essentially plastically deformable, energy absorbing members, which extend transversely over at least the greater part of the space between the exterior and interior panels of the body sides and/or doors and which vertically cover an area level with the bumpers of the vehicle, and in that the second reinforcing members comprise members which take up pressing loads, are incorporated in the seat cushion support level with the first reinforcing members and have outer end surfaces located adjacent to or at an insignificant distance from the interior panels of the body sides and/or doors.

The invention is based on the entirely new idea of optimal use of the deformation distance available between the exterior of the vehicle and the side of the seat facing outwards, in order to effectively brake the penetrating front of the striking vehicle, so that the driver or passenger is struck by a door panel or body side panel which has a relatively low velocity at the moment of contact. This is achieved by (1) filling the entire space between the exterior and interior panels, or a major portion thereof, with energy absorbing members, just at the most critical level, namely level with the part of the striking vehicle which first strikes the side, which is in practice the bumper; and (2) arranging abutments interacting with the energy absorbing members.

The members which take the pressing load and which are arranged to the seat bottoms function as abutments during deformation and assure that the deformation is essentially finished upon contact between the driver or passenger and the inside of the door or side of the car body, so that the entire mass of the car which is hit together with that of the driver or passenger is engaged in the absorption of energy in the subsequent acceleration to a common final velocity for the two cars.

The energy-absorbing members can be made of cellular plastic and the members which take the pressing load can consist of a pair of simple steel or aluminum pipes in each seat, making manufacture both simple and inexpensive. In practice it is possible with the system according to the invention, while substantially increasing the resistance to deformation, to achieve a reduction in vehicle weight compared with systems in the form of longitudinal tubular reinforcements in the doors or body sides for example.

The invention will be described in more detail here with reference to the accompanying drawings, in which FIG. 1 shows a partial cut-away perspective view of a portion of a passenger car body with an embodiment of a system for side collision protection according to the invention, FIG. 2 is a schematic cross section through a portion of the body in FIG. 1, FIG. 3 is a cross section corresponding to FIG. 2 with a somewhat modified system for side collision protection according to the invention.

FIG. 4 relates to a car hit from the side without a system according to the invention, and FIG. 5 a car hit from the side with a system according to the invention.

FIG. 6 relates to a car hit from the side without a system according to the invention, and FIG. 7 to a car with a system according to the invention.

Figure 1:
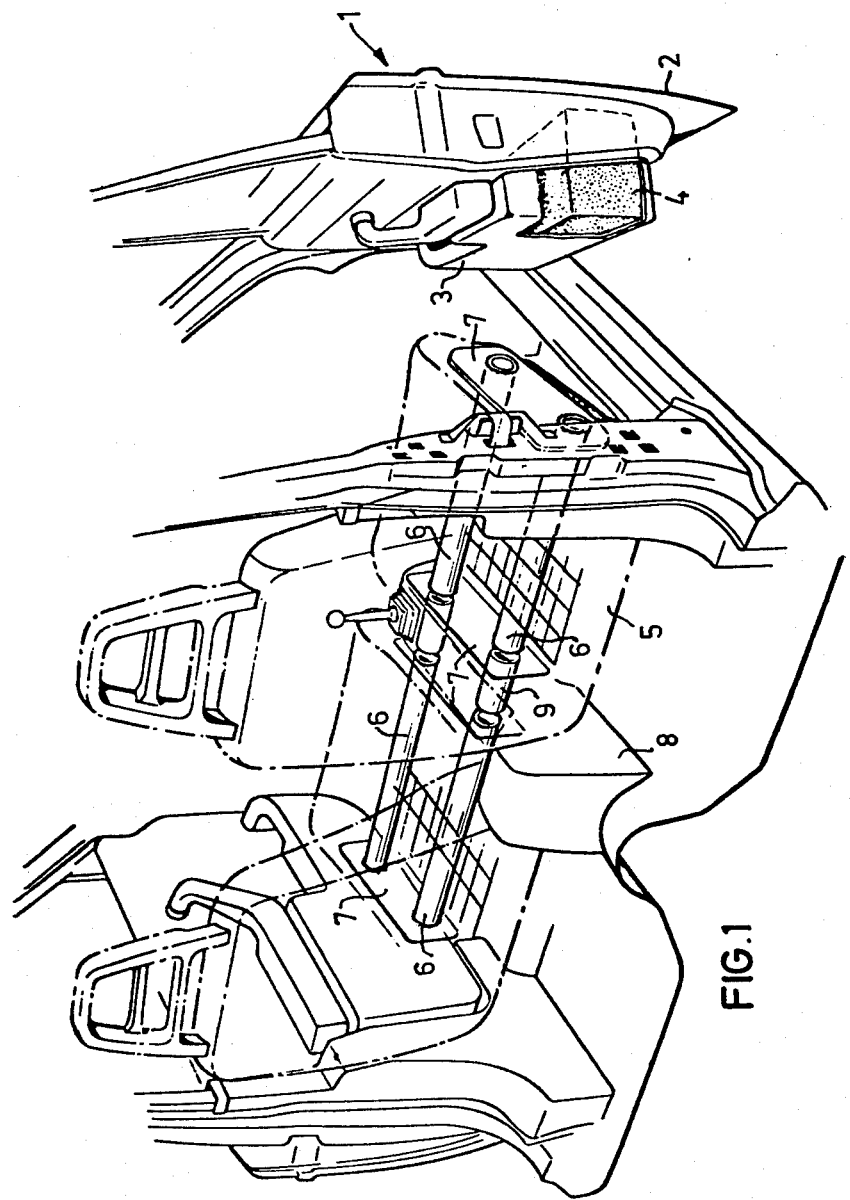
Figure 2:
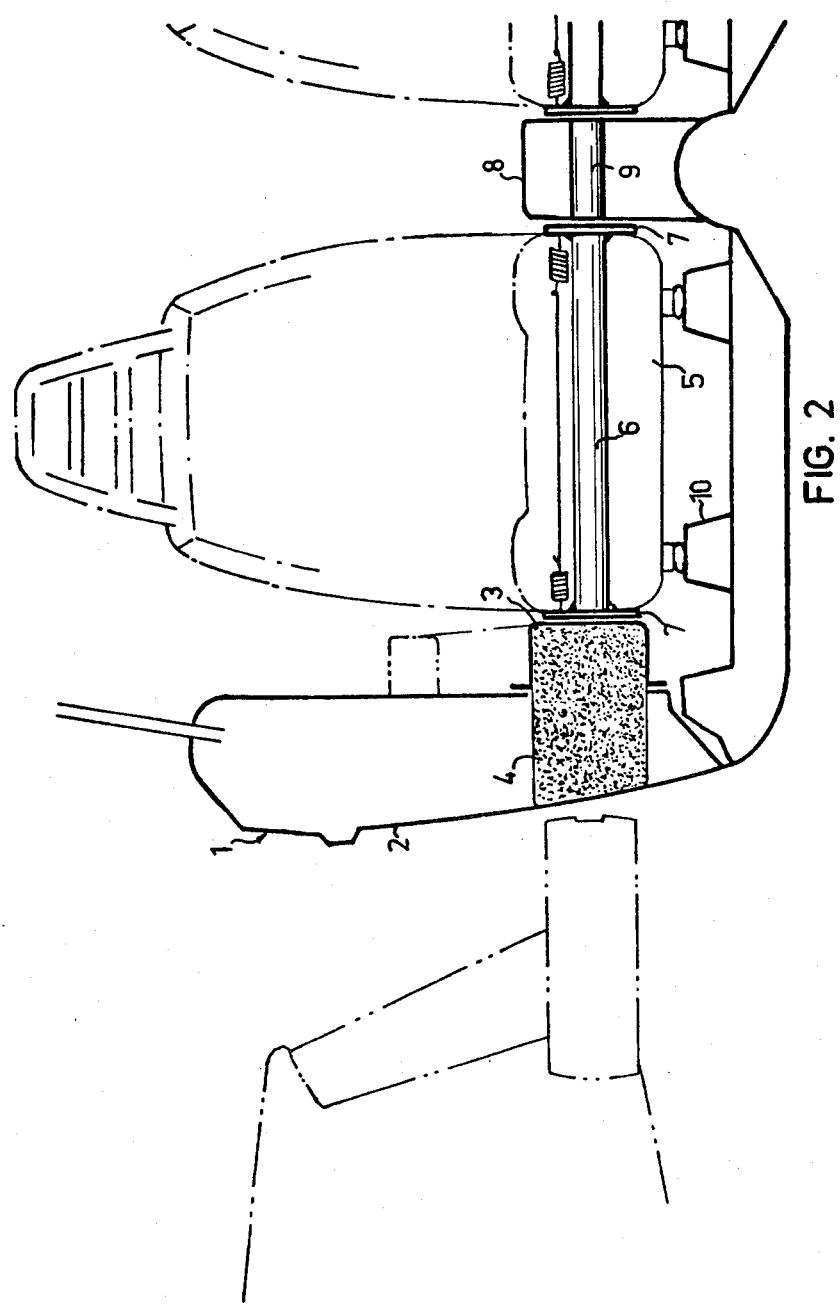

FIGS. 1 and 2 show an embodiment of a system of side collision protection according to the invention in which a door 1, between its exterior panel 2 and interior panel 3, has a plastically deformable, energy absorbing member 4 of polyurethane foam, for example. The door is made extra thick in the area of the seat cushion support 5 so that its interior panel 3 in this area will be closely adjacent to the seat cushion support 5 when the door is closed. The member 4 fills a space which vertically covers the area for the car bumpers as shown in FIG. 2 with dash-dot lines indicating the front end of the car. The usual height for bumpers on modern cars is approximately 400 mm above the ground for the lower edge and about 500 mm for the upper edge. As can be seen from FIG. 2, the member 4 will lie about level with the seat-bottom frame which carries the seat cushion.

Each seat cushion support 5 has two transverse pipes 6 of steel or aluminum extending across the entire width of the seat bottom. The outer ends of the pipes 6 are fixedly joined to plates 7 on both sides of the cushion support 5. The member 4 inside the doors fills longitudinally a large enough portion of the doors that the outer plates 7 will, regardless of the longitudinal seat adjustment, lie for the most part between the ends of the member 4. By arranging parallel pipes spaced from one another in this manner, the pressing loads result in an essentially rectilinear flow of force across the vehicle.

In the car shown with separate seats and a tunnel console 8 lying between the seats, the inner ends of the pipes 6 have their plates 7 closely adjacent to the console. The console can have an especially strong anchoring in the floor of the car and also be provided with transverse tubular reinforcements 9, corresponding to the pipes 6. In a car without a tunnel console and with a continuous seat over the entire width of the passenger compartment, pipes corresponding to pipes 6 extend across the entire breadth of the seat between the interior door panels. Regardless of whether the car has a full seat or separate seats, the seats are anchored at 10 in the floor in a special manner so as to effectively transmit large lateral forces to the floor.

Figure 3:
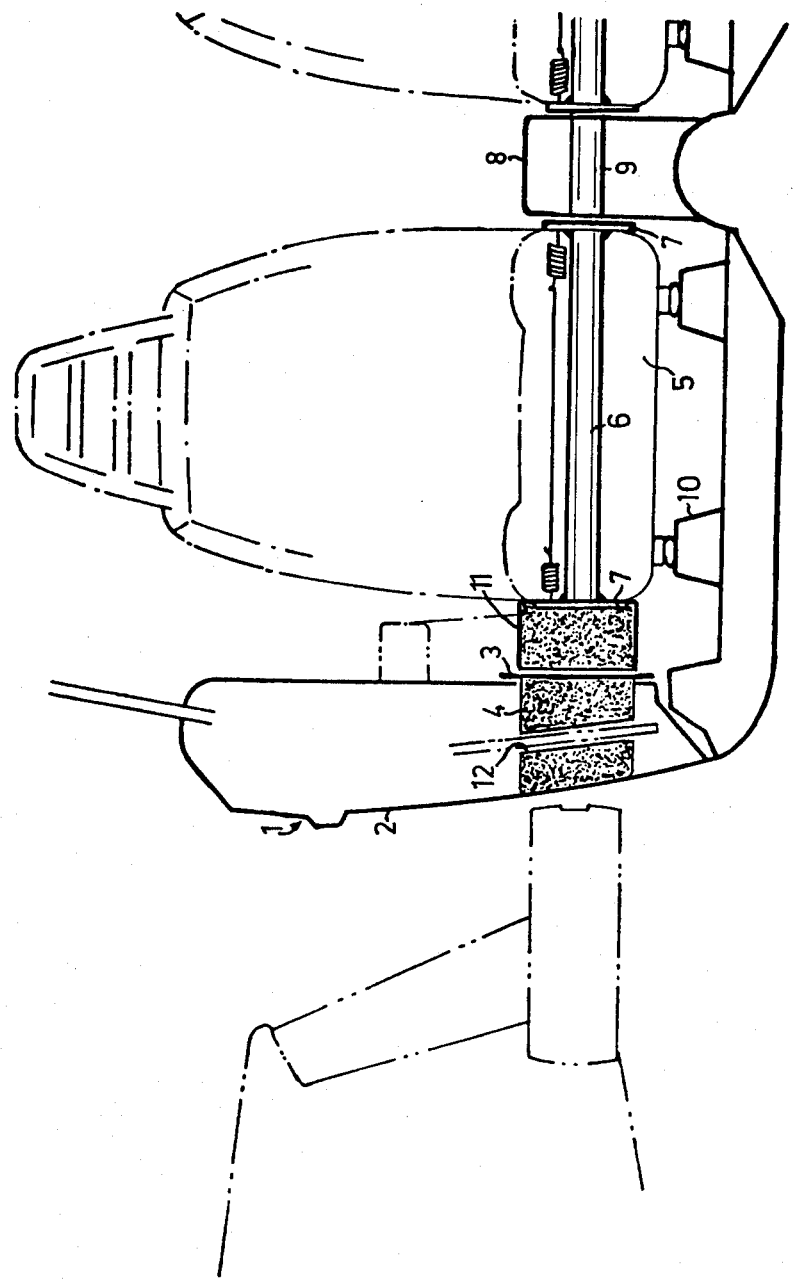

FIG. 3 shows a modified embodiment of the system according to the invention, which differs from the embodiment described above in two respects. Firstly, the member 4 is made with a slot 12 which is intended to provide room for a window winder mechanism. Secondly, the door has a "normal" thickness in the area of the seat cushion support 5, i.e. the interior panel 3 lies in this area essentially coplanar with the portion of the interior panel lying above it. The space between the door panel 3 and the side of the seat is filled with an energy absorbing member 11 of the same type as member 4. The member 11 is joined via the plate 7 to the seat cushion support 5 and has the same height as the member 4 and approximately the same length as the seat cushion support 5.

The construction described above is based, as has been stated previously, on the new idea of optimally using the deformation distance available between the exterior panel 2 of the door and the side of the seat, i.e. the distance to the side of the driver or passenger, to effectively brake the front of the striking vehicle before the driver or passenger makes contact with the interior panel 3 of the door. In a modern medium-sized car, this distance is on the order of 200 mm.

In order that the principle of the invention and its advantages will be fully understood, the diagrams in FIGS. 4–7 show the results of comparative tests between two identical passenger cars weighing approximately 1500 kg. One of the cars (called the unreinforced car in the following) was only provided with local tubular reinforcement in the door of the type mentioned in the introduction, while the second car (called the reinforced car in the following) was provided with a system for side collision protection according to the invention. The energy-absorbing members 4 consisted of polyurethane foam with a density of 30 g/dm$^3$ and the pipes 6 taking the pressing load were pipes with a diameter of 35 mm and a thickness of 2 mm.

During the tests high-speed cameras (ca 1200 exposures/sec.) and accelerometers were used to register the course of the collision. In the summary of the evaluated test results, shown in graph form in FIGS. 4–7, a represents a point in the area of contact between the bumper of the striking car and the door exterior of the car being hit, b a point on the interior door panel of the car being hit, located directly opposite to point a, and c is a point at hip level on an anthropometric dummy which represents the driver or passenger.

Figure 4:
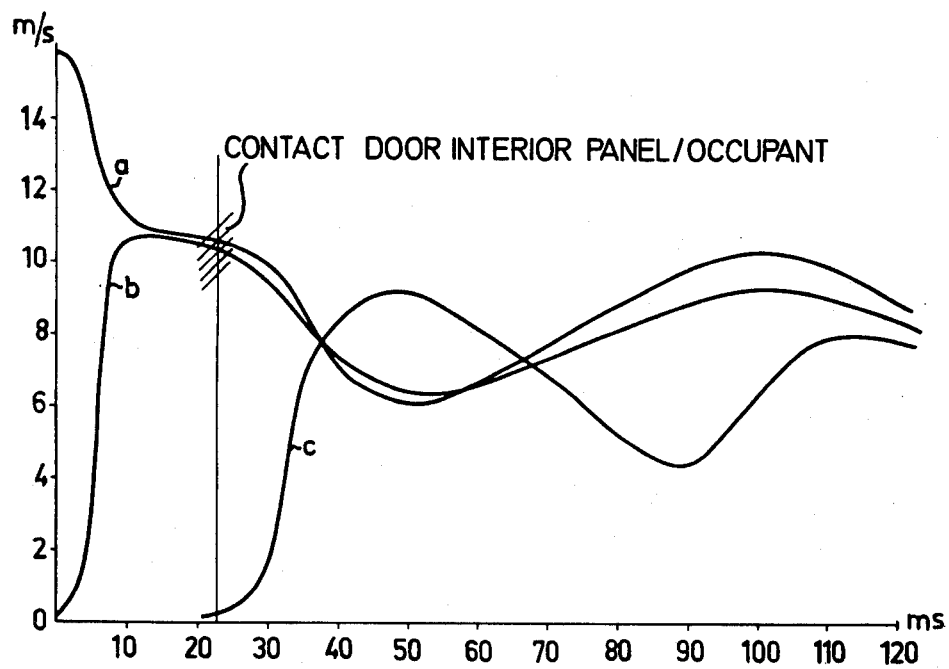
FIGS. 4 and 5 are graphs illustrating the velocities of the exterior and interior door panels and of a passenger, as a function of time from the moment of collision.
Figure 6:
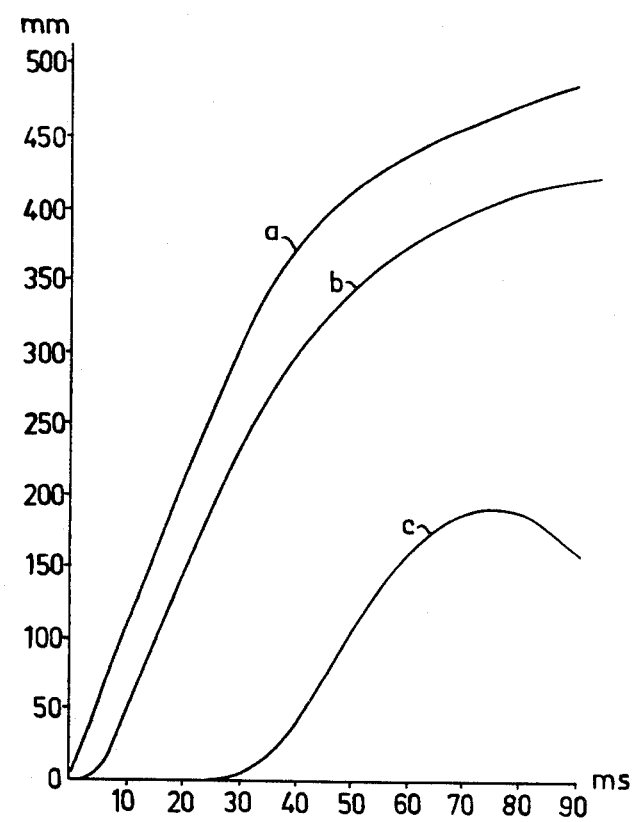
FIGS. 6 and 7 are graphs illustrating the deformation of the exterior and interior panels of a door and the movement of the passenger as a function of the time from the moment of collision.
Figure 7:
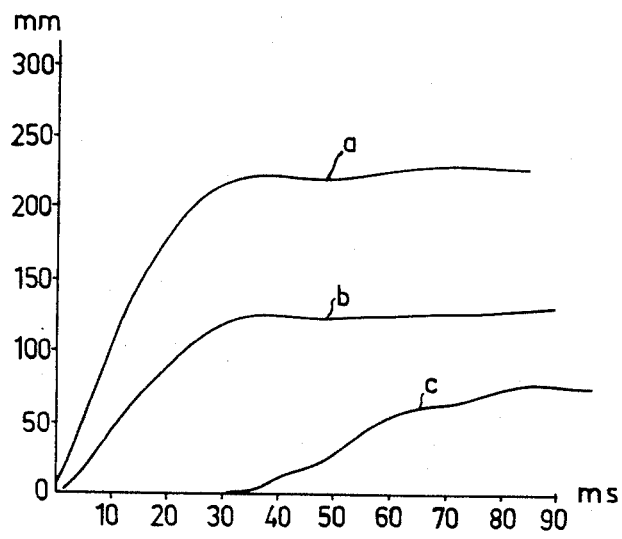

FIG. 4 shows for the unreinforced car the velocities of points a, b and c as a function of the time from first contact with the striking car, whose velocity at the moment of contact was about 15.5 m/s (35 mph). As can be seen from the graph, in about 10 m/s the velocity of the bumper of the striking car (a) (the exterior panel of the car being hit) was reduced to about 11 m/s. In the same time the interior panel (b) of the door accelerated from zero to approximately the same velocity. After about 25 m/s the hip (c) of the dummy was hit by the incoming door panel, which at that moment had a velocity of more than 10 m/s. The dummy was thus struck by a door panel with a very high velocity, in practice a higher velocity than the common final velocity of the two cars. After contact with the dummy, the door continued, as can be seen from the graph in FIG. 6, to penetrate into the car. The dummy was thus subjected to a very powerful acceleration, as can be seen from the steepness of the curve for point c in FIG. 4. The acceleration in this area was about 100 g. The total deformation distance for the interior panel (b) was about 400 mm. As can be seen in FIG. 6, the dummy was moved about 200 mm inwards by the incoming side of the door. In addition to the serious injuries resulting from the contact between the driver or passenger and the rapidly penetrating door panel, the long penetration can also cause serious injuries, caused by the seat belt and its interior locking mechanism, which the person lands on top of, or by the adjacent seat, against which the person is thrown.

Figure 5:
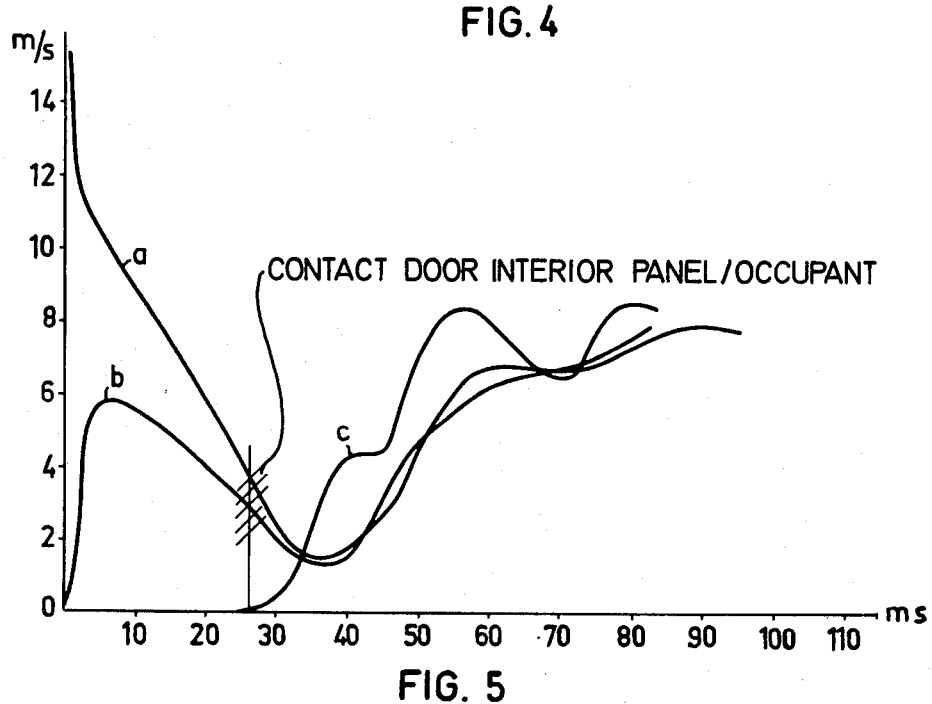

FIG. 5 illustrates in a corresponding manner the course of the collision for the reinforced car. Here the exterior door panel (a) was first subjected to a powerful change in velocity until the interior door panel (b) made contact with the dummy after about 25 m/s. The interior panel first accelerated up to about 6 m/s but then decelerated abruptly so that, when making contact with the dummy, it had a velocity of only slightly more than 3 m/s. Thus in the reinforced car, the dummy was struck by a door panel whose velocity was less than one third of the velocity of the door panel of the unreinforced car. This difference is especially apparent if one looks at the impact energy created between the driver or passenger and the door panel, which is proportional to the square of the relative velocity. It is about 9 times higher for the unreinforced car in the test. After contact with the dummy the deformation was essentially complete, as is shown by the diagram in FIG. 7. This means that the dummy, as can be seen from the graph, accelerated together with all of his own car up to a common final velocity for his own car and the striking car. By thus engaging the entire mass of the car which is hit, the maximum acceleration was reduced to about 38 g as compared to 100 g for the unreinforced car.

The test results thus prove that the system according to the invention produces a drastic change in the course of the collision, thus substantially lowering the injury criteria. In summary, the great positive effect results from the fact that, on the one hand, the velocity of the door panel relative to the driver or passenger is low, and, on the other hand, that the subsequent acceleration of the driver or passenger occurs involving essentially the entire mass of the car.

What I claim is:

1. System for protecting motor vehicle occupants against injury in side collisions, comprising exterior and interior panels of a car body side and/or doors, a seat support, first reinforcing members arranged between the exterior and interior panels of the car body side and/or doors, and second reinforcing members, incorporated in the seat support, and which extend transversely to the vehicle and are disposed to transmit, after a certain deformation of a press-loaded body side or door, the load to the floor of the vehicle and to the opposite body side or door, characterized in that the first reinforcing members (4) are made as essentially plastically deformable, energy absorbing members, which extend transversely over at least the greater part of the space between the exterior and interior panels (2 and 3 resp.) of the body sides and/or doors and which vertically cover an area level with the bumpers of the vehicle, and in that the second reinforcing members (6; 6,11) comprise transversely extending members which take up pressing loads and are incorporated in the seat support (5) level with the first reinforcing members, and outer end surfaces affixed to said transversely extending members and located adjacent to or at an insignificant distance from the interior panels of the body sides and/or doors.

2. System according to claim 1, characterized in that the members (6; 6,11) which take the pressing load extend so far in the longitudinal direction of the vehicle, and are arranged such that the pressing forces cause a substantially rectilinear flow of force across the vehicle.

3. System according to claim 1 or 2, characterized in that the first reinforcing members (4) are made of cellular plastic.

4. System according to claim 1, characterized in that the interior panels (3) lie adjacent to or at an insignificant distance from the outer sides of the seat bottoms and that the second reinforcing members are designed in their entirety as transversely extending rigid members (6) which take pressing loads.

5. System according to claim 4, characterized in that said rigid members (6) for taking pressing loads are made of metal tubes running transversely to the seat support (5), and vertical metal plates joined to the outer ends of said tubes and arranged parallel to the interior panels (3) of the body sides and/or doors.

6. System according to claim 1, characterized in that the interior panels (3) are spaced from the outer sides of the seats and that the second reinforcing members comprise, firstly, rigid members (6) for taking pressing loads, said members extending over the width of the seat supports and, secondly, essentially plastically deformable energy-absorbing members (11) which extend over the space between said interior panels and outer sides.

7. System according to claim 6, characterized in that said rigid members (6) for taking pressing loads are made of metal tubes running transverse to the seat cushion and that said energy-absorbing members (11) are made of cellular plastic members which are attached to the outer sides of the cushion support and have outer sides parallel to the interior panels of the body sides and/or doors.

8. System according to claim 1 in vehicles with separate seats arranged beside one another with a tunnel console between, characterized in that the second reinforcing members have inside ends adjacent to or at an insignificant distance from the sides of the console (8) and that the console has pressure force absorbing reinforcements (9).

9. System according to claim 1, characterized in that the first reinforcing members (4) fill such a large portion of the body sides and/or doors (1) longitudinally that the second reinforcing members are at least for the most part located between the ends of the first reinforcing elements, regardless of the longitudinal seat adjustment.

10. A safety system for providing transverse reinforcement to a motor vehicle for protecting the occupants against injury in side collisions comprising exterior and interior panels on the sides of the vehicle, deformable energy-absorbing means arranged bumper high between the exterior and interior panels on both sides of the vehicle, rigid members extending transversely of the vehicle intermediate the deformable energy-absorbing means on opposite sides of the vehicle, and longitudinally extending rigid surfaces affixed to the ends of the transversely extending rigid members and located adjacent to or at an insignificant distance from the deformable energy-absorbing means so that upon impact against the side of the vehicle the deformable energy-absorbing means will initially absorb energy by deformation against the longitudinally extending surfaces, and the transversely extending rigid members and the longitudinally extending rigid surfaces will thereafter resist further deformation by transmitting the load to the floor of the vehicle and to the opposite body side or door.

11. A safety system as set forth in claim 10 in which the deformable energy-absorbing means is cellular plastic material interposed between the exterior and interior panels of the vehicle.

12. A safety system as set forth in claim 10 including at least one longitudinally extending rigid member intermediate opposite ends of the transversely extending rigid members.

13. A safety system as set forth in claim 10 for a vehicle having separate seat supports arranged beside one another with a console therebetween and in which the transversely extending rigid members are incorporated in the seat supports and in the console and including rigid longitudinally extending means intermediate the rigid members of the console and one seat support and intermediate the rigid members of the console and the other seat support.

* * * * *